United States Patent
Carrasco

(10) Patent No.: US 11,491,678 B2
(45) Date of Patent: Nov. 8, 2022

(54) CUTTING DEVICE FOR PROCESSING PRODUCT UNITS

(71) Applicant: A O SCHALLINOX GMBH, Schocherswil (CH)

(72) Inventor: César Carrasco, Schocherswil (CH)

(73) Assignee: A O SCHALLINOX GMBH, Schocherswil (CH)

( * ) Notice: Subject to any disclaimer, the term of this patent is extended or adjusted under 35 U.S.C. 154(b) by 550 days.

(21) Appl. No.: 16/609,659

(22) PCT Filed: Jun. 1, 2018

(86) PCT No.: PCT/EP2018/064540
§ 371 (c)(1),
(2) Date: Oct. 30, 2019

(87) PCT Pub. No.: WO2018/224410
PCT Pub. Date: Dec. 13, 2018

(65) Prior Publication Data
US 2020/0147821 A1   May 14, 2020

(30) Foreign Application Priority Data
Jun. 7, 2017   (EP) .................................. 17174864

(51) Int. Cl.
*B26D 1/45*   (2006.01)
*B26D 7/06*   (2006.01)
(Continued)

(52) U.S. Cl.
CPC ............ *B26D 7/0633* (2013.01); *A23N 5/00* (2013.01); *B26D 1/45* (2013.01); *B26D 1/553* (2013.01);
(Continued)

(58) Field of Classification Search
CPC . A23N 5/00; B26D 1/45; B26D 1/553; B26D 3/30; B26D 7/0633; B26D 7/086
See application file for complete search history.

(56) References Cited

U.S. PATENT DOCUMENTS 2,163,791 A * 6/1939 Lang ........................ B26D 3/30
83/409.1
4,467,711 A * 8/1984 Oiso ........................ A23N 5/00
99/582
(Continued)

FOREIGN PATENT DOCUMENTS

| CN | 106393192 A | 2/2017 |
| DE | 20 2006 003 637 U1 | 6/2006 |
| WO | 2015/150260 A1 | 10/2015 |

OTHER PUBLICATIONS

Sep. 11, 2018 Search Report issued in International Patent Application No. PCT/EP2018/064540.
(Continued)

*Primary Examiner* — Omar Flores Sanchez
(74) *Attorney, Agent, or Firm* — Oliff PLC

(57) ABSTRACT

A device includes a blade, which is movable within an associated working space for cutting product units, and a conveying device in which the product units can be individually conveyed into the working space of the blade. The conveying device includes at least one two-part conveying channel associated with the blade, in which on one side first conveyor elements and on the other side second conveyor elements are guided, which are assigned to one another in pairs and which have each a recess for partially receiving a separated product unit. The sides of the first and second conveyor elements, which are facing one another, delimit therebetween the free working space, so that the blade is guidable within the working space partially or completely through the product units held in the first and second conveyor elements which correspond to one another.

15 Claims, 12 Drawing Sheets

Figure 2A:
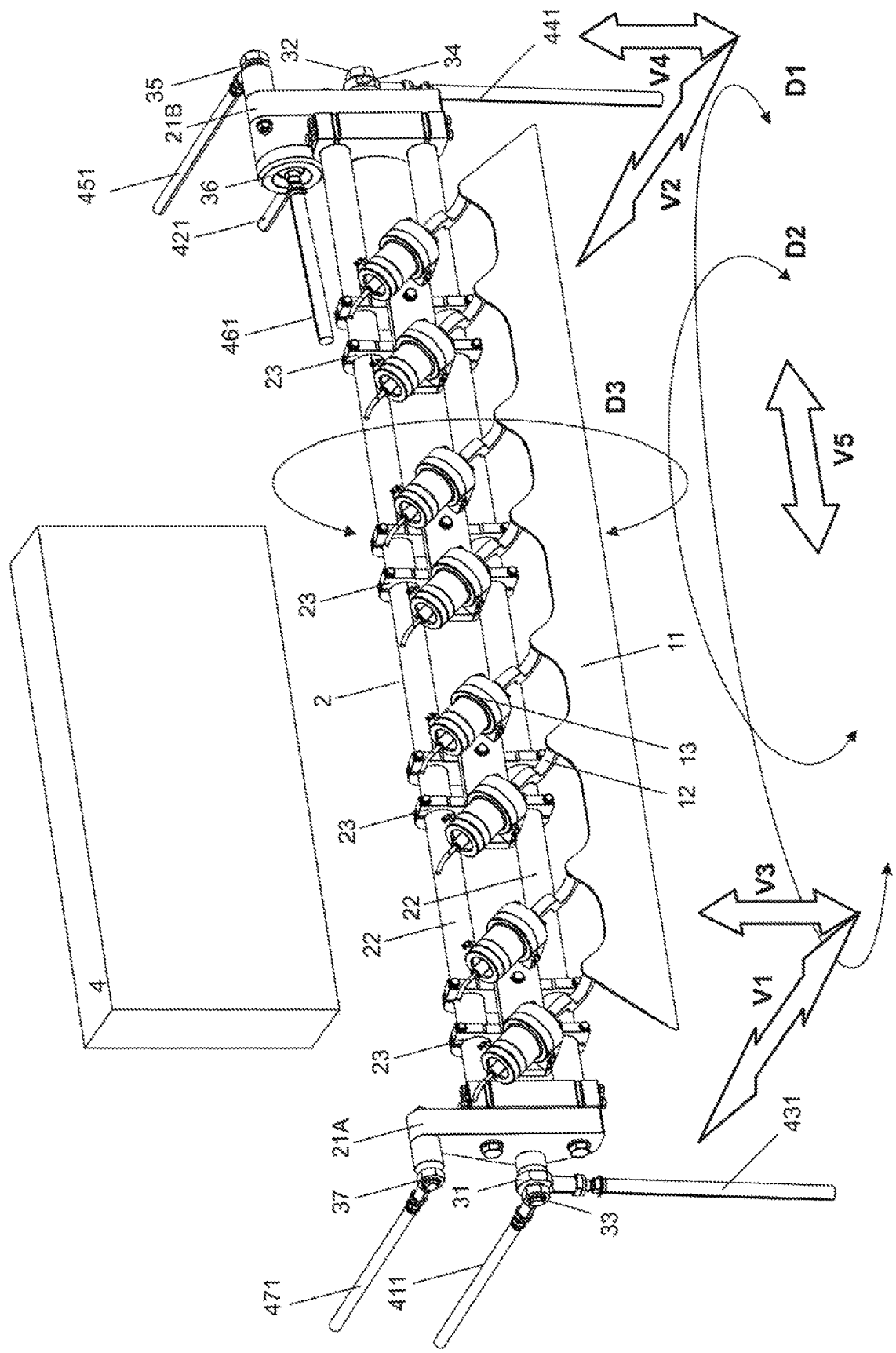

(51) Int. Cl.
*A23N 5/00* (2006.01)
*B26D 1/553* (2006.01)
*B26D 7/08* (2006.01)
*B26D 3/30* (2006.01)

(52) U.S. Cl.
CPC ............... *B26D 7/086* (2013.01); *B26D 3/30* (2013.01); *B26D 2210/02* (2013.01)

(56) References Cited

U.S. PATENT DOCUMENTS

| | | | | |
|---|---|---|---|---|
| 4,793,248 | A * | 12/1988 | Frederiksen | A23N 5/00 99/575 |
| 5,671,661 | A * | 9/1997 | Giamello | A23G 7/0037 99/450.6 |
| 6,125,743 | A * | 10/2000 | McIntyre | A23N 5/03 99/582 |
| 2002/0078811 | A1* | 6/2002 | Moss | B26D 7/0633 83/466 |
| 2017/0113371 | A1* | 4/2017 | Van Cauwenberghe | B26D 1/553 |
| 2017/0361484 | A1* | 12/2017 | Pardini | B27B 31/006 |
| 2017/0368707 | A1* | 12/2017 | Keller | B25J 15/0273 |
| 2021/0315252 | A1* | 10/2021 | Crescenzo | B26D 3/30 |

OTHER PUBLICATIONS

Sep. 11, 2018 Written Opinion of the International Searching Authority issued in International Patent Application No. PCT/EP2018/064540.

* cited by examiner

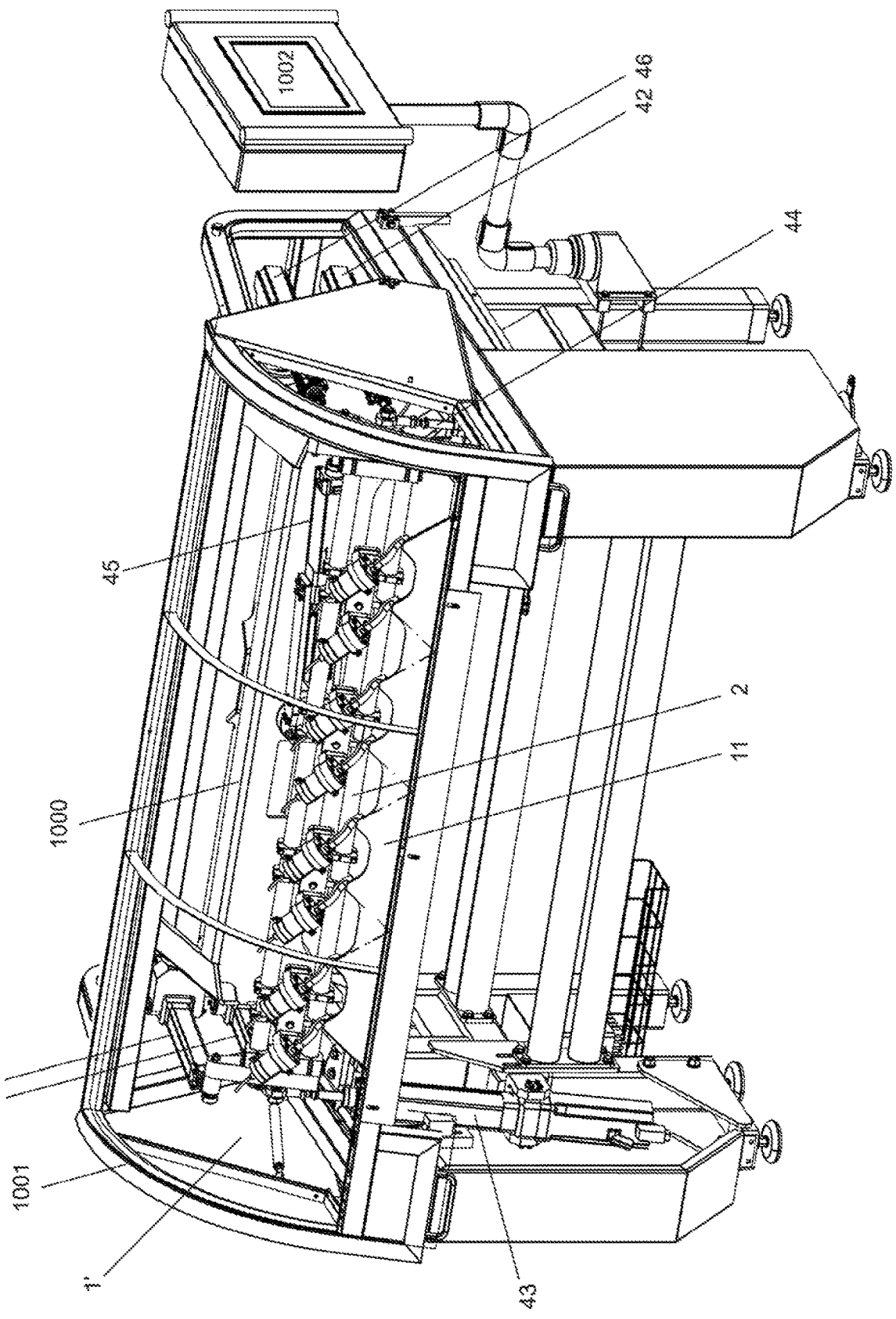

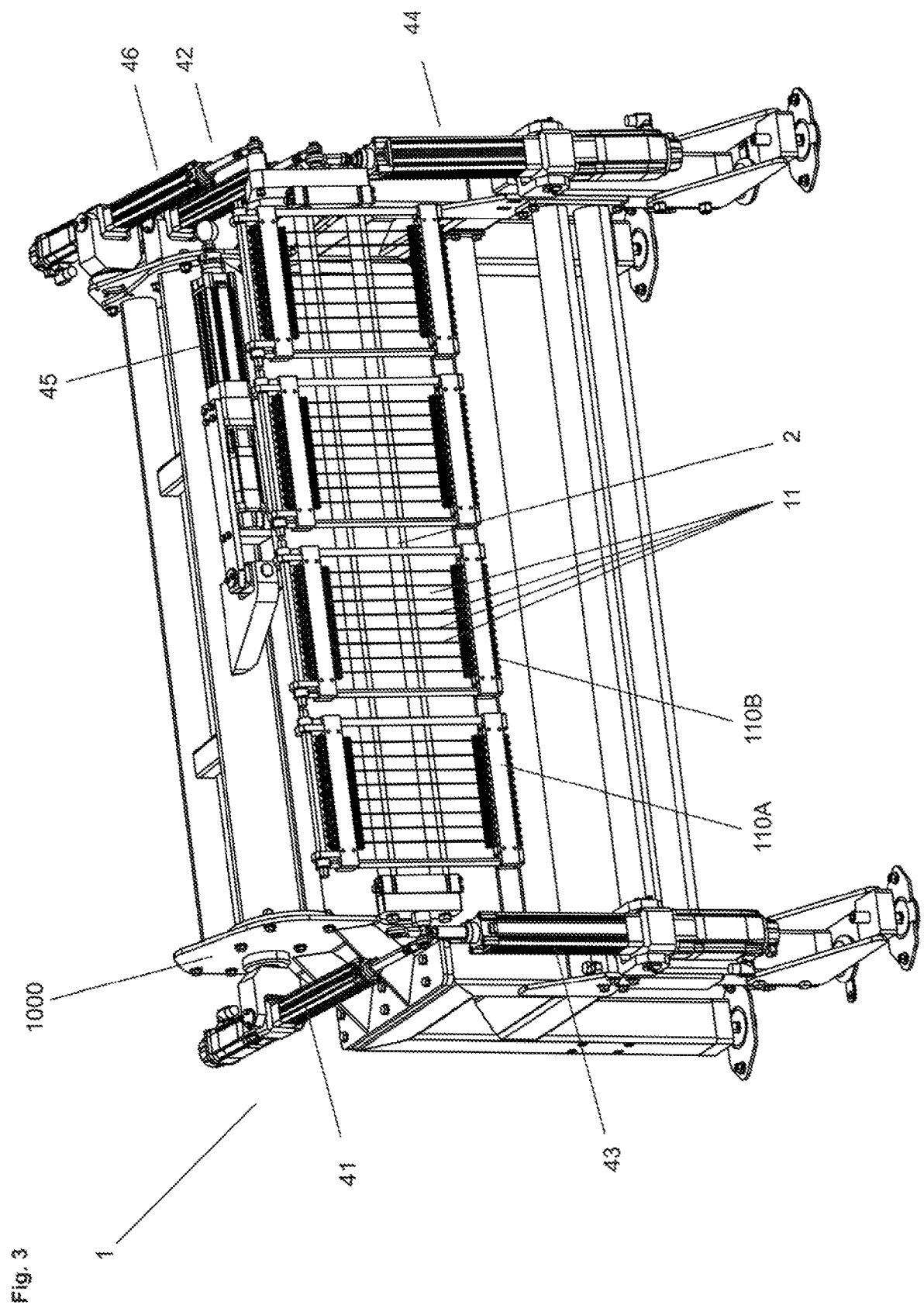

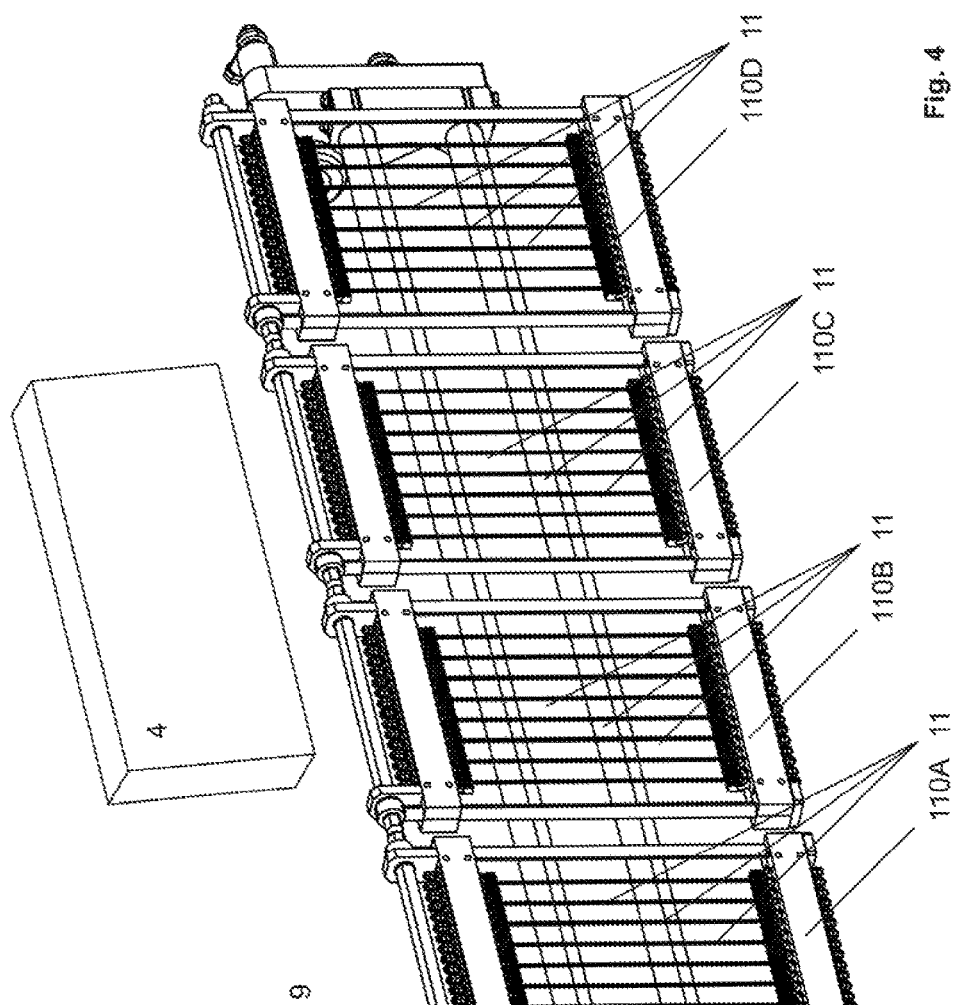
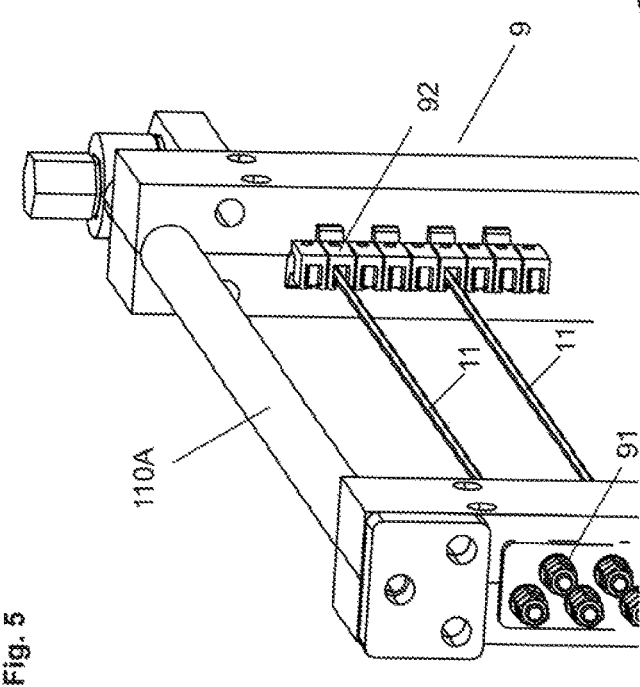

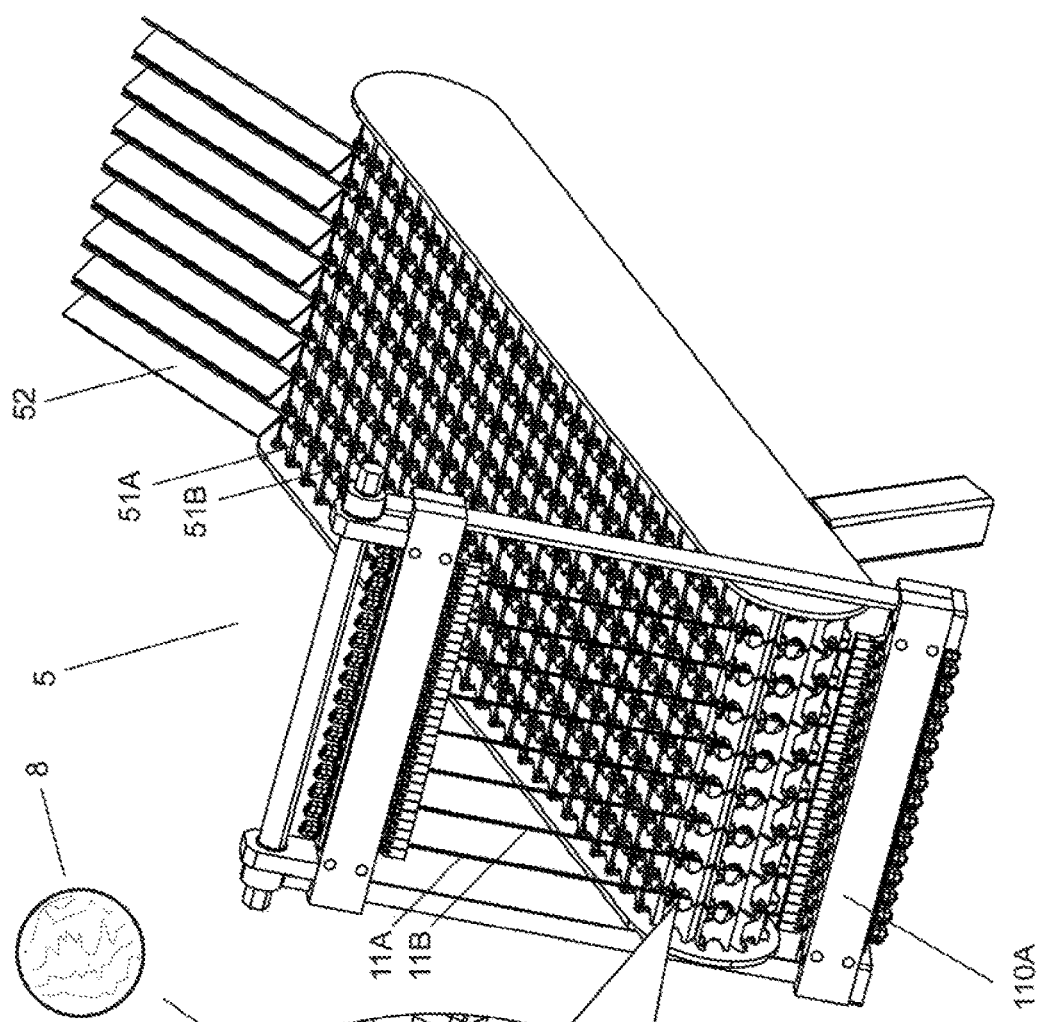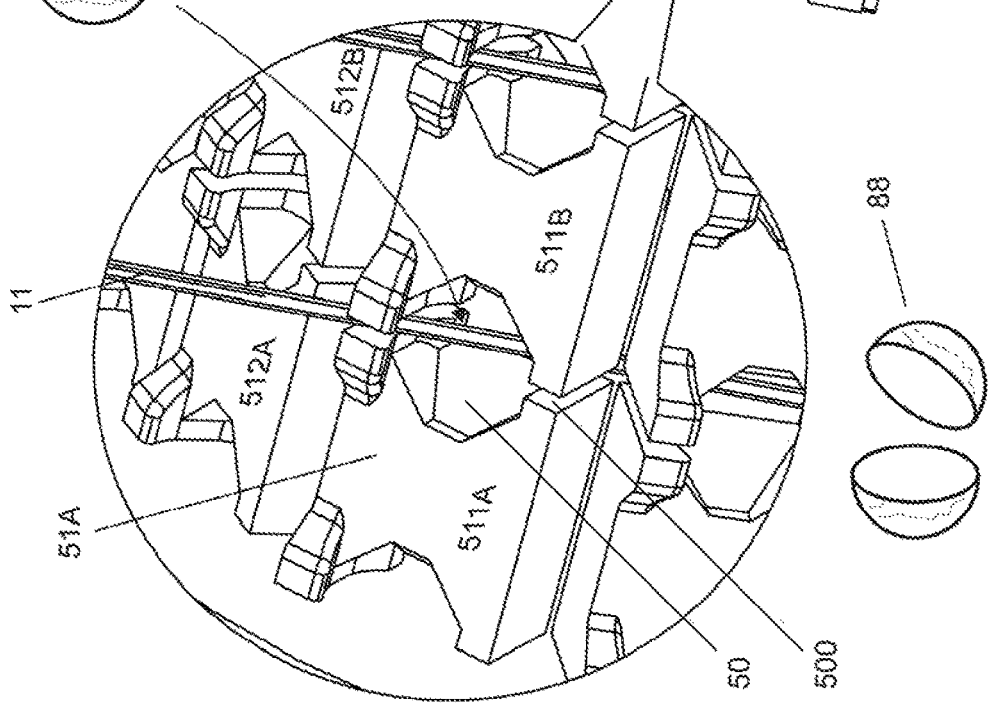

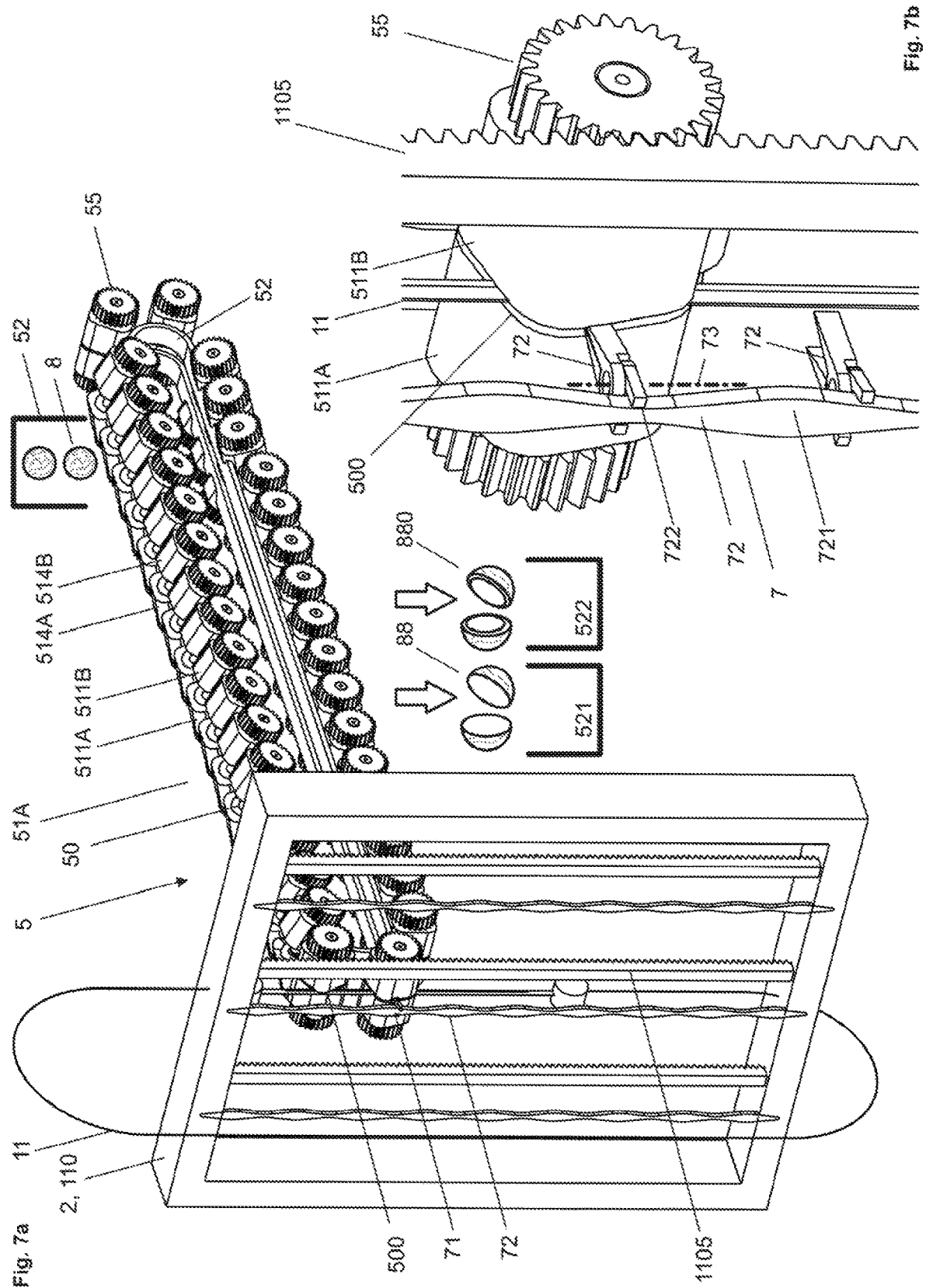

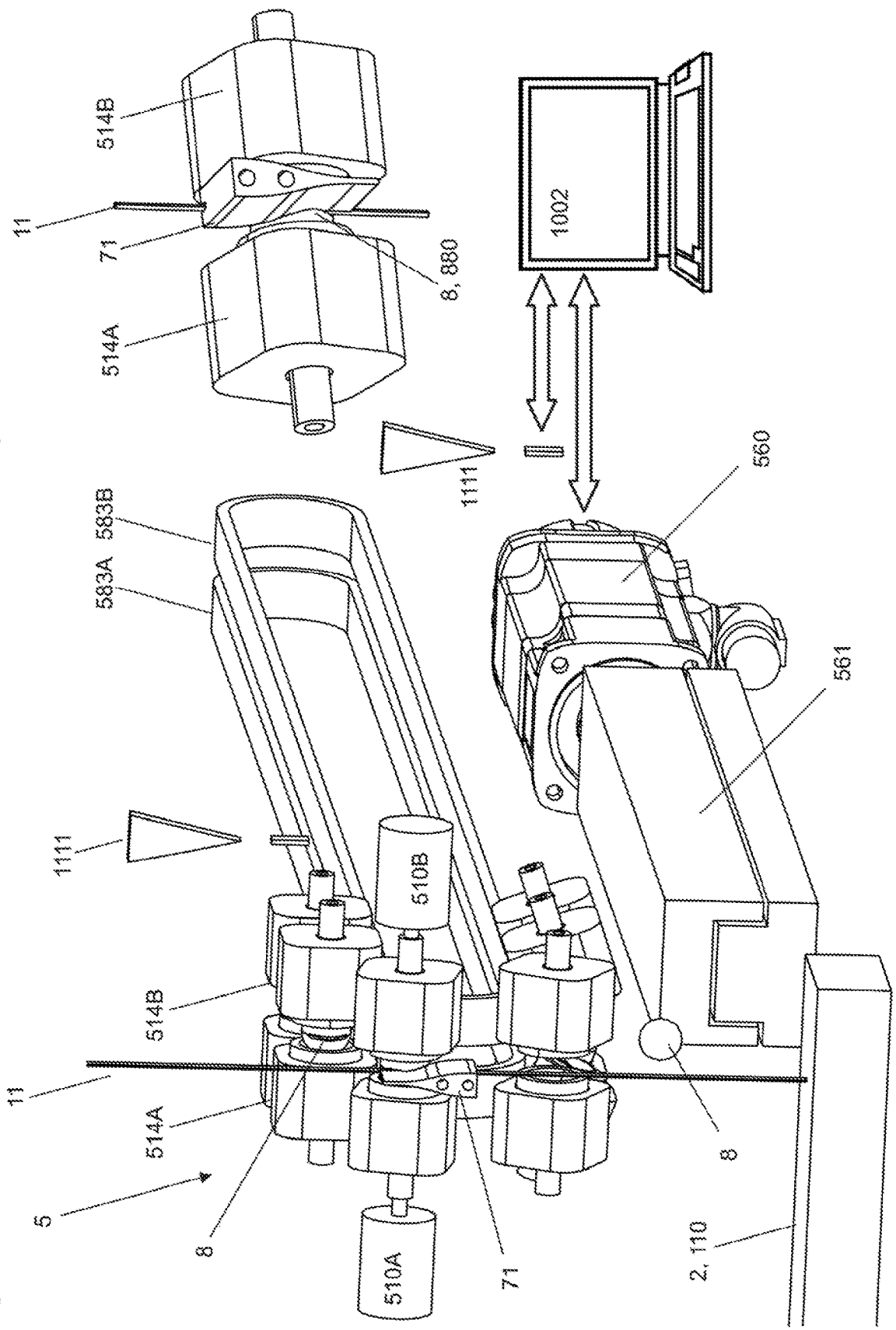

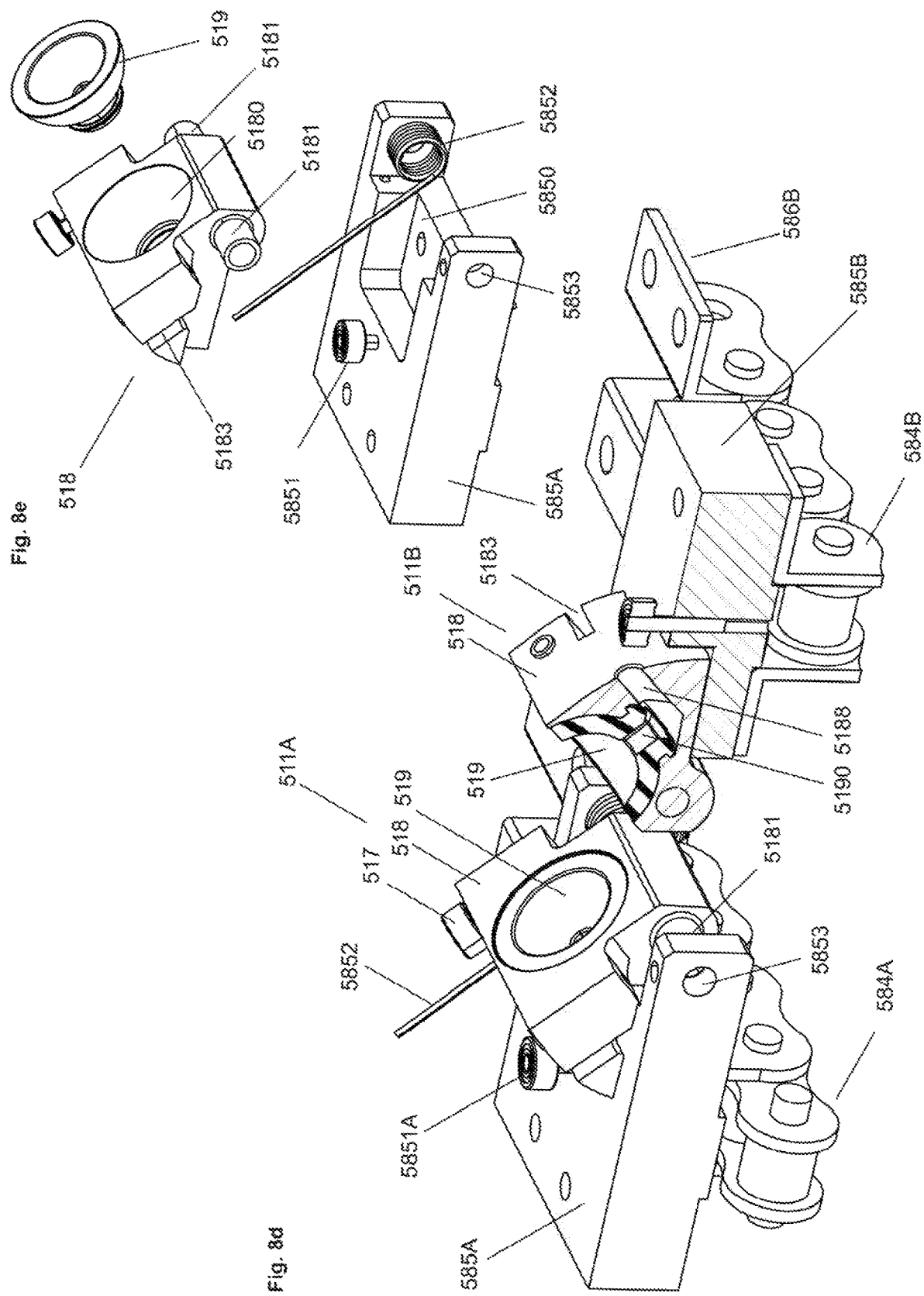

CUTTING DEVICE FOR PROCESSING PRODUCT UNITS

The invention relates to a cutting device for processing a product, in particular for processing nuts, which must be divided and, if necessary, freed from a shell.

In many industrial applications, in particular in the food industry, products with specific dimensions have to be provided. Food products such as bread, sausages or cheese are often divided into tranches and packaged. Natural products such as vegetables, fruits, nuts and the like are also often processed.

For this purpose, e.g. cutting devices with rotating cutting discs are provided, which are guided against the products at high cycle frequencies in order to carry out the required cuts. Cutting devices of this type have major disadvantages. The parallel operation of several cutting discs is associated with difficulties. Furthermore, a low cutting quality results with considerable material losses. Small products, such as nuts, can therefore scarcely be processed. Furthermore, cutting discs require a lot of space and corresponding safety distances.

From the WO2015150260A1 a device is known which serves to cut a process material with a blade is connected to a drive device, which is held by a framework and which has several actuators that are connected each on one side to the framework via a first swivel joint and that are connected each on the other side to the framework via a second swivel joint in such a way that the blade holder is solely held by the actuators and can be moved within a working volume and rotated if necessary. Within the working volume the blade can be moved forwards and backwards, downwards and upwards and preferably also to the side. This device makes it possible to optionally cut larger objects, which are fed, for example, via a conveyor belt. This cutting device is not suitable for small products such as nuts.

U.S. Pat. No. 5,671,661A discloses a conveying device, by means of which small objects, e.g. hazelnuts, can be conveyed separated in several rows. A plate with openings is provided for this purpose, which can hold one product, e.g. a hazelnut, during the processing process. However, products, such as hazelnuts, which are conveyed separated in such conveying devices cannot or not efficiently be processed, e.g. being cut or freed from a shell.

The present invention therefore based on the object of creating an improved cutting device with at least one blade.

In particular, a cutting device has shall be created which allows the individual product units to be processed in an advantageous way, e.g. to be freed from a shell and/or split or cut.

Product units, such as hazelnuts, shall be freed from a shell and/or precisely divided into two halves without losses occurring. The processing of food products shall also succeed optimally, even if their dimensions change within a wide tolerance range of e.g. 10% to 50%.

It shall always be possible to precisely divide the food products into the desired proportions. Alternatively, it shall be possible to take samples from the product units so that they can be tested periodically.

The separated food products shall not be exposed to unwanted impacts and shall be delivered in optimal quality.

If a shell is to be separated from a food product, such as a nut, this should be done without damaging the food product or the nut kernel. Furthermore, a reliable separation between the shell and the food product shall be possible so that these can be deposited separately.

This task is solved with a device as defined claim 1. Advantageous embodiments of the invention are defined in further claims.

The device comprises a blade, which is movable within an associated working space or working range for cutting product units, and a conveying device in which the product units can be individually conveyed into the working space of the blade. The working space is a working volume in which the cutting edge of the blade is movable as desired to cut a food product, optionally a shell, partly or completely.

According to the invention the conveying device comprises at least one two-part conveying channel associated with the blade, in which on one side first conveyor elements and on the other side second conveyor elements are guided, which are assigned to one another in pairs and which have each a recess provided for partially receiving a separated product unit. The sides of the first and second conveyor elements, which are facing one another, delimit therebetween the free working space, so that the blade is guidable within the working space partially or completely through the product units held in the first and second conveyor elements which correspond to one another.

The conveyor elements can be designed in such a way that any product units, such as raw or processed food products, can be captured and processed. Product units can be e.g. cocoa beans; coffee beans; vegetables, such as tomatoes and potatoes; cooked eggs; dough with filling; frozen or dried meat; nuts, such as hazelnuts; peel fruits, such as oranges, mandarins, grapefruits, melons; fruit kernels, such as mango seeds; dairy products, such as cheese; as well as parts made of non-biological materials, such as metal, wood, stone, glass, ceramics or the like. The recesses in conveyor elements may include spherical or cuboid segments.

Preferably, individual product units are introduced sequentially into the working space and processed. If a larger working space is selected, it is possible to introduce several product units into the working space and process them simultaneously. However, if only one product unit is introduced into the working space, it can be processed individually using a cutting device that is preferably designed for this purpose. The cutting edge can be guided sideways and/or frontally along curves. For example, the cutting edge of the blade can be guided wave-like forward and/or along a line or curve in a plane parallel to the cutting edge to insert a cut into a shell of a product unit. For example, a seesaw movement of the blade can also be implemented. The cutting movements can also be combined, so that lateral movements can be carried out in combination with frontal movements. Product units can therefore be processed peripherally, but can also be partially or completely be cut and divided. Furthermore, mispositioning of the product units can be measured and compensated by shifting the blade.

The individual processing of the product units is particularly advantageous if the blade and/or the conveyor elements can selectively perform movements. A shell can therefore also be separated by introducing the blade peripherally into the product unit and turning the product unit then by moving the conveyor elements. Preferably the conveyor elements are rotated around an axis, which runs at least approximately perpendicular to a cut surface, along which the blade or the cutting edge of the blade can be moved.

Also samples can advantageously be cut out from the product units. E.g. samples can be cut out, which have the shape of a piece of cake. This can be done particularly easy if wire-shaped blades are used.

In a preferred embodiment the at least one blade is attached to a blade holder, which is connected to a drive device held by a frame and by means of the drive device can be rotated and/or guided along a working path within the working space, which runs linearly or along a curve.

Preferably, the drive device comprises several actuators, which are individually controllable and which are connected each on one side via a first swivel joint to the blade holder and which are connected each on the other side via a second swivel joint to the framework, so that the blade holder is held solely by the actuators.

Preferably the blade holder has at least two blades, which are each assigned to a conveying channel and a corresponding working space, and by means of which product units fed via the assigned conveying channel can be processed or cut or trimmed and, if necessary, freed from a shell.

Hence, by suitably controlling the actuators, it is thus possible to guide, align and position the blades within the working volume as required. With the blades, product units fed in parallel in rows, e.g. hazelnuts, can be advantageously cut, if necessary divided into halves.

The blades can be moved forward and backward with any amplitude, e.g. in the range of 0.1 mm-5 cm and with almost any frequency from 0.1 Hz to 1,000 Hz. The blades can therefore also be subjected to vibration movements so that the blades can more easily penetrate into the product units.

The actuators are therefore not only used to move the blades in space, but also to influence the cutting process.

By selecting the actuators accordingly, the size of the working space can be determined. Preferably, cylindrical actuators or linear drives are provided, which have an axially displaceable piston rod. By selecting the actuators, in particular the length and alignment of the piston rods, the executable movements and rotations of the blades can be determined. For example, it can be provided that the blades can be moved forward and backward in two or three directions and rotated by at least one axis. Blades can be provided which have a cutting edge on both sides and which can therefore make a cut on a first or second product units or first and second product units in both directions of movement. The choice of blades with two cutting edges doubles the working possibilities not only in one plane but within the entire working space.

The actuators are controlled by means of a control program provided in a control unit. Preferably all actuators are individually controllable. Depending on the movements and vibrations to be performed, several actuators can also be controlled identically. If the blades are only to be moved parallel and held in the same orientation, the actuators that are aligned parallel to the direction of movement are controlled identically. The blades can be tilted or rotated by an unequal control of the actuators.

The swivel joints connected to the actuators can be identical or different and are selected according to the movements that the actuators shall perform. The first swivel joints connected to the blade holder are for example ball joints, hinge joints, fork joints, angle joints or combinations with two joint functions. The second swivel joints, which are connected to the frame, are preferably ball joints, hinge joints, fork joints, angle joints or combinations of these joints with two joint functions.

The actuators can be driven electrically, hydraulically or pneumatically, combinations of which are possible. Piston rods of electrically operated actuators can be extended particularly precisely. For example, the piston rod is coupled to a spindle which is rotated by a number of turns by means of a stepper motor corresponding to the required stroke.

The actuators can be driven electrically, hydraulically or pneumatically, combinations of which are possible. Piston rods of electrically operated actuators can be driven particularly precisely. For example, the piston rod is coupled to a spindle which is rotated by a number of turns by means of a stepper motor corresponding to the required stroke.

The blade holder preferably has two side plates connected to each other by at least one cross member, to which preferably the first swivel joints are attached. The energy converters are preferably mounted in pairs on the cross member by means of mounting devices.

In preferred embodiments, ultrasonic generators are connected to the blades by coupling elements. The coupling elements, which connect the energy converter to the blade, are preferably arc-shaped and connected, preferably welded, to the blade back on the front side or back side.

Optimum processing of the product units is achieved by optimum blade guidance and optimum feeding and presentation of the product units.

For uninterrupted conveying of the product units, the first and second conveyor elements are preferably connected to a common endless member, an endless belt or an endless chain. Alternatively, the first conveyor elements are connected to a first endless member, an endless belt or an endless chain, and the second conveyor elements are connected to a second endless member, an endless belt or an endless chain. The first and second conveyor elements are preferably moved synchronously. However, asynchronous movements can also be performed for loading or unloading the product units.

The product units can therefore be delivered from a dispenser or separating device to pairs of corresponding conveyor elements and conveyed into the working area of the corresponding blade. Preferably, a number of conveyor channels arranged parallel to each other, each with a blade, are provided. The cutting device according to the invention is therefore freely scalable.

Since naturally obtained product units often differ significantly in their dimensions and shapes, an elastic insert is preferably arranged in each of the recesses of the first and/or second conveyor elements, which allows a product unit whose dimensions lie within a tolerance range to be accommodated, preferably without play. Product units with different dimensions and shapes can therefore reliably be received and precisely processed.

In a particularly preferred configuration, the first conveyor elements and/or the second conveyor elements each have a holder, which is provided with the recess and optionally an insert inserted therein and which is connected rotatable between an open end position and a closed end position to a support plate that is connected to the endless member. To accommodate a product unit by first and second conveyor elements assigned to each other in pairs, their holders can be turned outwards. For the processing of the product units, the holders of the first and second conveyor elements assigned to each other are rotated against each other until the holders, which are normally aligned vertically, limit the working space of the blade. The fronts of the holders therefore form the sides the first and second conveyor elements, which are facing one another and which limit the working space of the blade. Between the fronts of the holders therefore lies a part of the product unit, which can be machined by means of the blade, if necessary cut through.

The holders can be opened and/or closed in any way, e.g. pneumatically, magnetically or mechanically, e.g. by spring force. Different procedures and devices can be provided for opening and closing the holders.

Preferably the holder and the support plate are connected by a spring, by means of which the holder is automatically turned into the open position. The closing movement is effected by the application of force, which counteracts the spring force. Preferably, the holder is equipped with a guide element, e.g. a guide roller. Furthermore, a one-piece or two-part guide plate is provided, which has at least one guide track, along which the guide elements can be guided to rotate the associated holder into the closed position.

The processing of the product units is particularly advantageous if they are clamped and/or suctioned within the conveyor elements. For example, the shells, which have been split, can be held in the conveyor elements while the product unit is removed by gravity. Then the shells can be removed from the conveyor elements by interrupting the suction or by applying compressed air. The holder and/or the insert are therefore preferably equipped with a suction channel which can be connected or connectable to a controllable suction device.

The operating process of the product units by means of the inventive device can be optimised by means of further modules controlled by a control unit. For this purpose a first measuring device can be provided, by means of which the position of a product unit used in the conveyor elements corresponding to each other is measured. In order to optimize the individual processing of this product unit, the movement of the blade can be adapted according to the measurement. Alternatively, the conveyor elements can be moved.

By means of a second measuring device, the processed product units or parts thereof can be optically inspected e.g. after opening the holders and, depending on the inspection result, ejected at a suitable location.

Figure 2B:
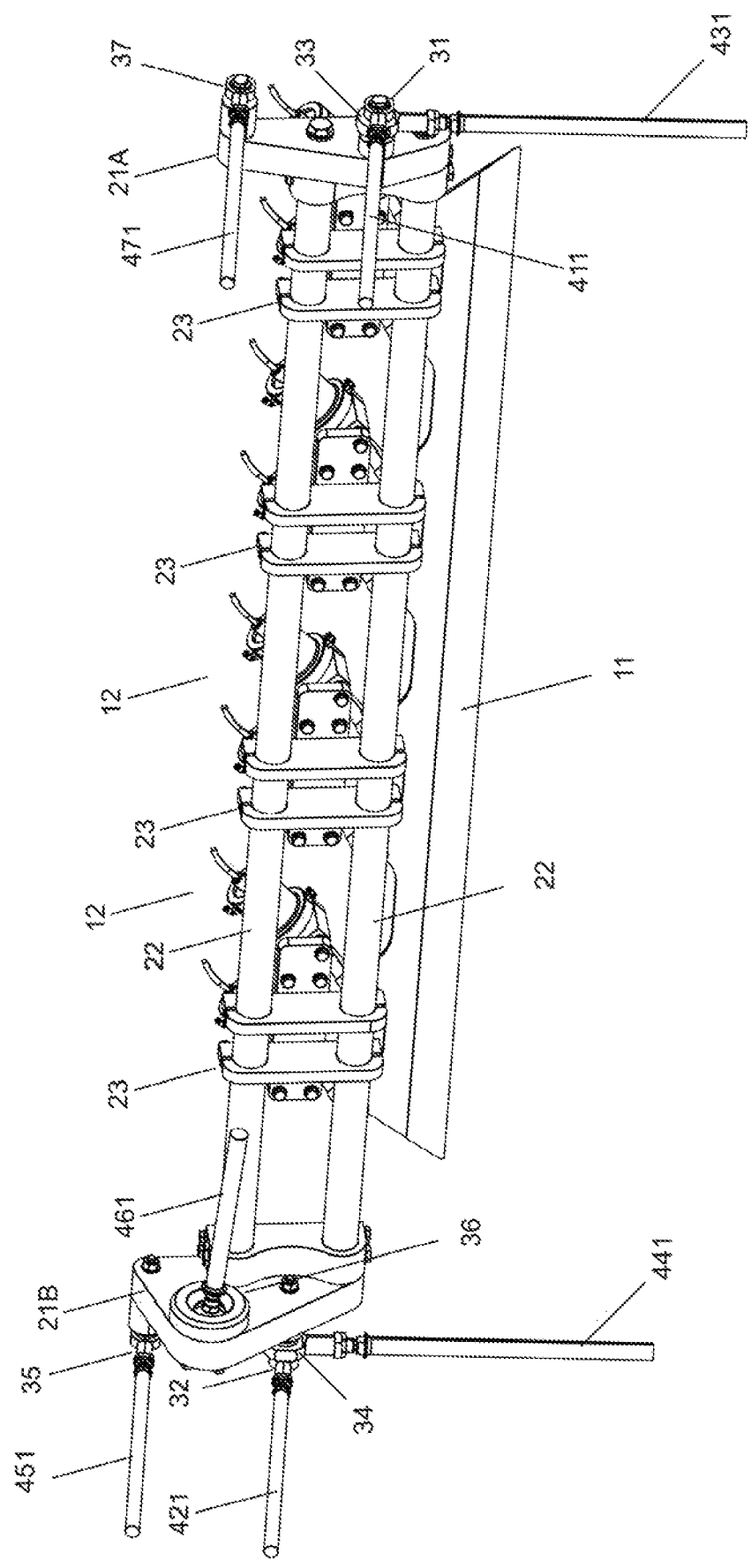
Figure 8A:
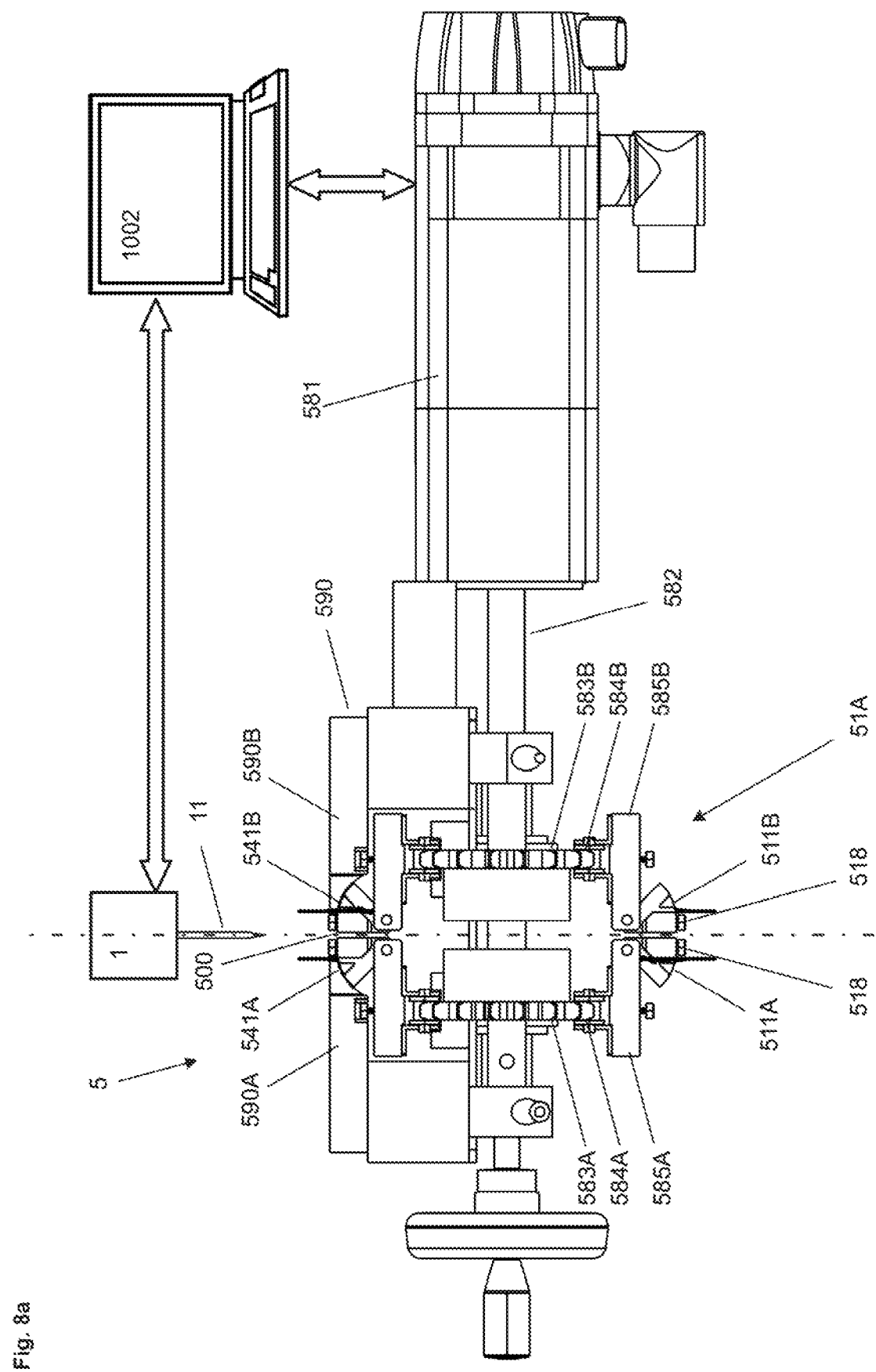
Figure 8B:
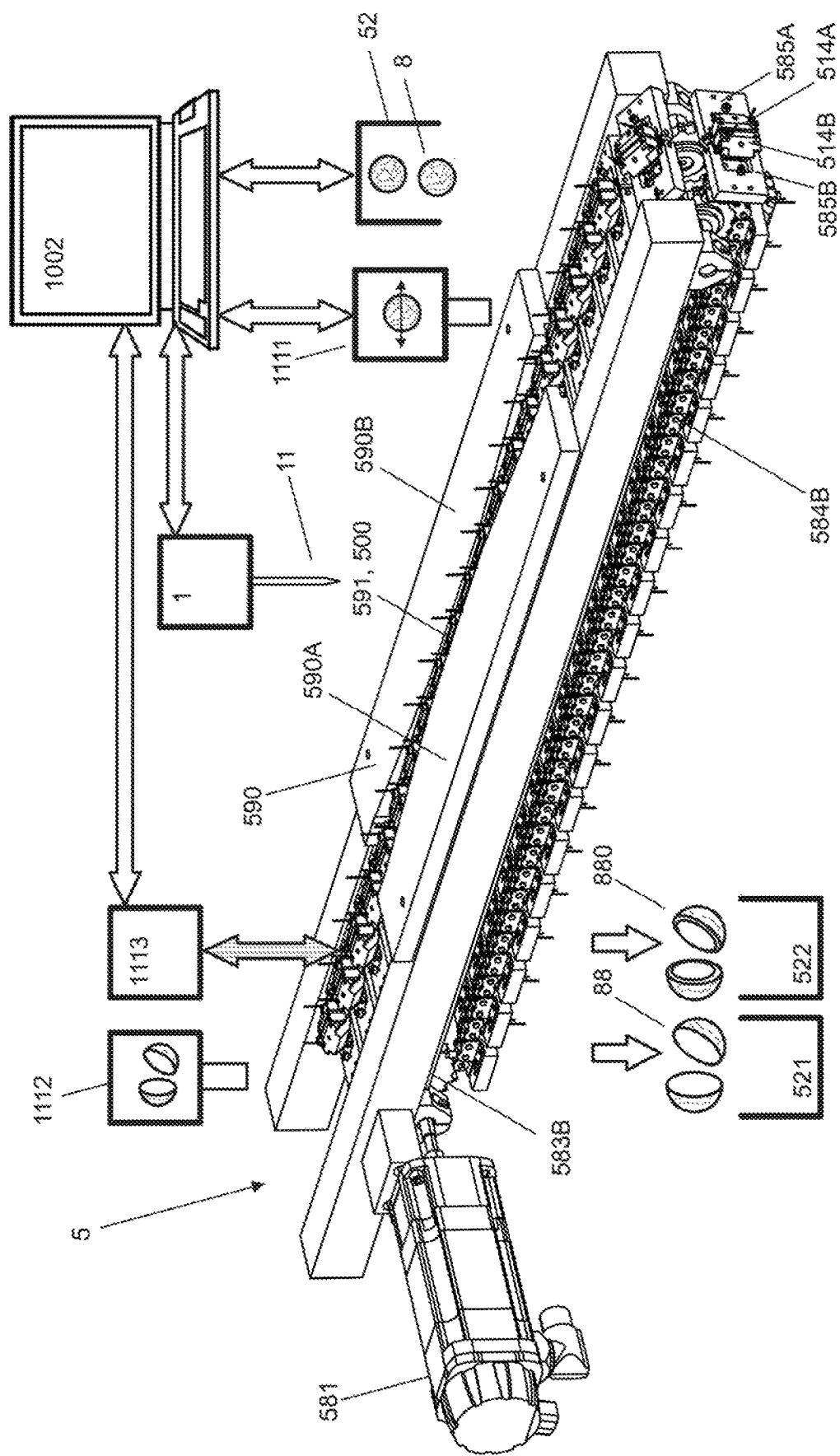
Figure 8C:
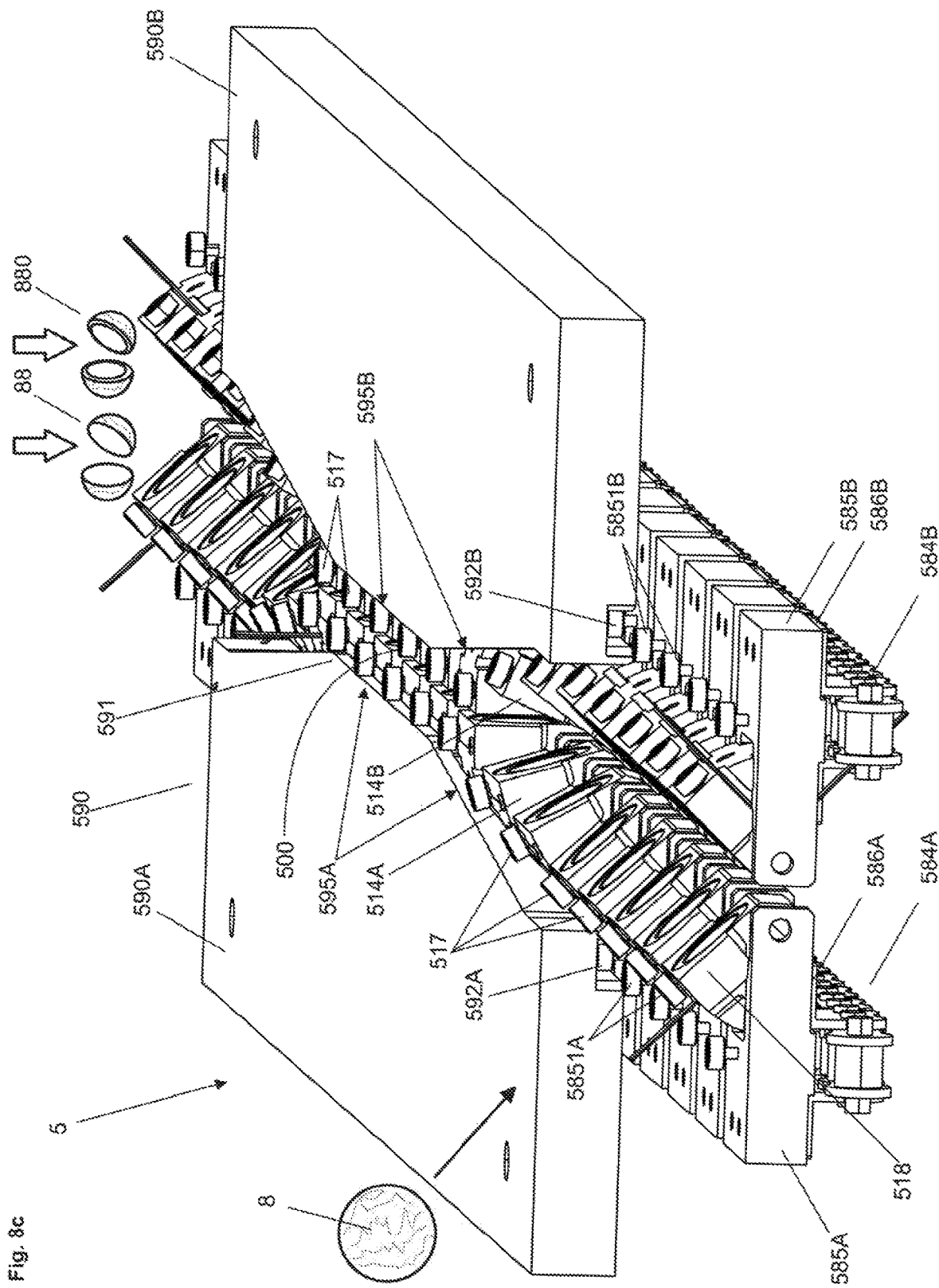

In the following, the invention is explained in more detail with reference to drawings. Thereby shows:

FIG. 1 the device 1' disclosed in WO2015150260A1, which serves the processing at least one process material and which therefore comprises at least one blade 11 held by a blade holder 2 that is coupled to the seven actuators 41, ..., 47, which are pivotally connected to a framework 6 and by means of which the blade 11 can carry out almost any movements within a working volume in order to process, particularly cut or atomize the process material;

FIG. 2a a symbolically shown drive device 4 as well as the blade holder 2 of FIG. 1, which has two side plates 21A, 21B, to which piston rods 411, ..., 471 of the actuators 41, ..., 47 are coupled via first swivel joints 31, ..., 37 and which are connected to one another by transverse struts 22, which hold eight energy converters 13, which are connected via coupling elements 12 to a one-piece blade 11;

FIG. 2b the blade holder 2 of FIG. 2a from the rear side;

FIG. 3 an inventive device 1 with a blade holder 2, which holds blades 11, of which always eight units are held under tension in a mounting frame 110A, 110B;

FIG. 4 the blade holder 2 of FIG. 3 with four mounting frames 110A, 110B, in each of which eight blades 11 are held under tension;

FIG. 5 the mounting frame 110A of FIG. 4 with clamping devices 9, 91, 92 by means of which the blades 11 are held under tension;

FIG. 6a the mounting frame 110A of FIG. 4 coupled to a conveying device according to invention 5, which comprises eight conveying channels 51A, 51B, to each of which a blade 11 is assigned;

FIG. 6b a part of the first conveying channel 51 of FIG. 6a in the area of the engagement of the corresponding blade 11;

FIG. 7a in preferred embodiments, a blade holder 2 with a mounting frame 110 which holds a wire-shaped blade 11, and a conveying channel 51A of a conveying device 5, which comprises first and second conveying elements 511A, 511B, ..., which are laterally rotatable relative to each other to receive and enclose a product unit;

FIG. 7b corresponding conveyor elements 511A, 511B of FIG. 7a, enclosing a product unit (not visible) and delimiting a working space 500 into which the wire-shaped blade 11 has been inserted;

FIG. 7c the conveying device 5 of FIG. 7a with first and second conveyor elements 541A, 541B, which are rotatable by means of motors 510A, 510B and with a measuring device 1111 and a displacement device 561;

FIG. 7d the conveyor elements 541A, 541B of FIG. 7c with a product unit 8, which is freed from a shell 880 by means of a wire-shaped blade 11 and a wedge 71;

FIG. 8a an inventive cutting device 1 with a preferably designed conveying device 5 and a control unit 1002;

FIG. 8b the cutting device 1 and the conveying device 5 of FIG. 8a with a dispensing device 52, a first and second receiving device 521, 522, a first and second measuring device 1111, 1112 as well as a suction device 1113, which preferably all are connected to the control unit 1002 via control lines and/or data lines;

FIG. 8c the conveying device 5 of FIG. 8b, which has a two-part guide plate 590, with which the conveyor elements 511A, 511B or the holders provided thereon are rotatable in order to receive product units 8 and to be able to release them again after processing;

FIG. 8d the first conveyor element 511A and, in sectional view, the second conveyor element 511B of FIG. 8a, each with a holder 518, which is connected rotatable to a support plate 585A, 585B; and FIG. 8e the first conveyor element 511A of FIG. 8d in exploded view.

FIG. 1 shows the device 1' disclosed in WO2015150260A1, which serves for processing at least one process material, which is delivered to the device 1, for example, on different planes and from different directions. The device 1 comprises at least one blade 11, which can be supplied with ultrasonic energy and which is held by a blade holder 2. In this embodiment, the blade holder 2 is pivotally connected to seven actuators 41, ..., 47, which are also pivotally connected to and held by a framework 2. The actuators 41, ..., 47 are preferably linear actuators with a piston rod, which can be driven by an electric motor and extended and retracted step by step. Using the piston rods, the blade 11 can therefore carry out almost any movement within a working volume in order to process, particularly to cut or atomize the process material. The motion sequences, which are programmable and controlled by a control unit 7, depend on the number of actuators used, whose control is coordinated accordingly. The control unit 7, which is held by a swivel arm, preferably has a screen or touch screen via which commands can be entered to select pre-programmed motion sequences or to define new motion sequences for the blade 11.

Programming of the device 1 can be done in several ways. For example, the blade 11 can be guided along a desired cut surface, whereby the motion of the piston rods is measured and registered. Furthermore, curve surfaces can be defined in a geometric space, after which the positions of the first ball joints can be determined and the distances between the corresponding first and second ball joints can be determined. The actuators 41, . . . , 47, especially the seventh actuator 47, which can move the blade axially, can also perform oscillating movements.

FIG. 1 shows that the device 1 has a relatively long one-piece blade (see FIG. 2*a*) or multi-piece blade 11 (see FIG. 3*a*) which can be moved within a relatively large working volume determined by the length of the piston rods of the actuators 41, . . . , 47. Preferably a one-piece blade 11 is used. In spite of the large dimensions of the blade 11 and the large working volume as well as the manifold applicability, optionally with processing several process goods, the invention allows the construction of the device 1 with spatial dimensions that are essentially determined by the size of the blade 11. The columnar actuators 41, . . . , 47 can be arranged parallel to elements of the framework or frame 6 and increase its dimensions only insignificantly.

The device 1 also includes protective covers and a hood 65, which can be pushed back and folded up.

FIG. 2*a* symbolically shows a drive device 4 consisting of the actuators 41, . . . , 47 as well as the blade holder 2 of FIG. 1 with a one-piece blade 11. The blade holder 2 comprises two side plates 21A, 21B, to which the piston rods 411, . . . , 471 of the actuators 41, . . . , 47 are coupled via first swivel joints 31, . . . , 37. The side plates 21A, 21B are connected to each other by two cross struts 22, on which eight energy converters 13 are mounted in pairs by means of four mounting devices 23. The energy converters 13 are connected to the one-piece blade 11 via coupling elements 12. The coupling elements 12 each have a semi-circular arc, which is perpendicular to the blade 11 and welded to the blade 11. The coupling elements 12 are arranged in an even grid, which ensures that the ultrasonic energy delivered by an ultrasonic generator to the energy converters 13 is evenly coupled into the blade 11. The blade 11 is thus held by eight coupling elements 12, via which the ultrasonic energy is simultaneously fed in.

To better represent the blade 11 and the blade holder 2, the actuators 41, . . . , 47 were symbolically combined in one block; i.e. the drive device 4. Shown are only the piston rods 411, . . . , 471 of the actuators 41, . . . , 47, which are coupled via first swivel joints 31, . . . , 37 coupled to the side plates 21A, 21B of the blade holder 2. The first swivel joints 31, . . . , 37 are preferably ball joints, wherefore the piston rods 411, . . . , 471 can be rotated within an opening angle. At maximum deflection and rotation of the piston rods 411, . . . , 471 by the corresponding opening angle, the piston rods 411, . . . , 471 run along the circumferential surface of a cone. The opening angle can be very large and can even exceed 180°. Individual piston rods 411, . . . , 471 can pass during certain movements of the blade 11 through different angular ranges. For some of the swivel joints 31, . . . , 37 different opening angles can be provided. It is essential that the blade 11 can be moved within the desired working volume and rotated as required. FIG. 2*a* further shows that individual ones of the first joints 31 and 33 or 32 and 34 can also be arranged directly next to each other, so that the actuators 41, 43 or 42, 44 are practically coupled to the blade holder 2 at identical points.

FIG. 2*a* shows the basic movements, the displacements V1, V2, V3, V4, V5 and the rotations D1, D2, D3, which the blade 11 can perform individually or in combination.

By means of the first and the second piston rod 411, 421, which are aligned horizontally in parallel to each other and are coupled each to one side the blade holder 2, the left side and the right side of the blade 11 can be moved independently of each other or in combination equal (V1=V2) or unequal (V1≠V2), if necessary in the opposite direction, forwards and backwards. A different movement of the piston rods 411, 421 also results in the rotary movement D1.

By means of the third and the fourth piston rod 431, 441, which are aligned vertically in parallel to each other and which are each coupled on one side to the blade holder 2 (at the same points as the first and the second piston rod 411, 421), the left side and the right side of the blade 11 can be displaced independently of each other or in combination equal to (V3=V4) or unequal to (V3≠V4), possibly in opposite directions, downwards and upwards, resulting in the rotary movement D2.

In order to avoid a rotation of the blade 11 when the first two actuators 41, 42 are actuated, a fifth actuator 45 is preferably provided, which is aligned parallel to the first and second actuators 41, 42 and is eccentrically connected to the blade holder 2 via a corresponding one of the first swivel joints 35. If the fifth actuator 45 is actuated identically to the first and the second actuator 41, 42, a parallel displacement of the blade 11 forward or backward takes place. If the fifth actuator 45 is controlled differently, a rotation D3 around one axis takes place, which is defined by the coupling points of the first two actuators 41, 42. By the rotation D3 the blade 11 a cut can be executed. Alternatively, the blade 11 can be kept horizontally aligned and stable, so that a powdery process material can be placed on it, which is then atomized under the influence of ultrasonic energy.

By actuating the sixth piston rod 461, which is aligned almost parallel to the blade 11, a lateral displacement of the blade 11, for example along its longitudinal axis, can be carried out (V5). This means that a vertical cut can be carried out in combination with a horizontal cut, which means that even the most difficult process material can be cut precisely. A lateral oscillation can also be superimposed on the vertical movement to facilitate the cutting process.

FIG. 2*b* shows the blade holder 2 with the two side plates 21A, 21B as well as the two cross struts 22 and the four associated mounting fixtures 23 of FIG. 2*a*, which hold the energy converter 12 and the blade 11 connected to it, from the rear side.

FIG. 3 shows an inventive device 1 without conveying device 5, with a blade holder 2, which holds 32 blades 11. Eight blades 11 each are held under tension in a mounting frame 110A, 110B. The blades 11 are held and aligned so that they can interact with the conveying devices 5 described below.

FIG. 4 shows the blade holder 2 of FIG. 3 with four mounting frames 110A, 110B, 110C, 110D, each holding eight blades 11 under tension. The drive device 4 with the actuators is shown symbolically. The blade holder 2 with the four mounting frames 110A, 110B, 110C, 110D can be mounted on the device of FIG. 1 and controlled in the sequence as described above.

The blades 11 can be moved in space and can be displaced backwards and forwards with amplitudes e.g. in the range of 0.1 mm-5 cm and with frequencies from 0.1 Hz to 1'000 Hz, in order to execute any cutting movement and to influence the cutting process at the same time at will. Vibrations can be superimposed arbitrarily on the blades 11 movements.

FIG. 5 shows the mounting frame 110A of FIG. 4 with tensioning devices 9, 91, 92 by means of which the blades 11 are held under tension. The blades 11 are e.g. connected with tension rods and nuts 91, 92. In preferred designs, ultrasonic energy is fed into the blades 11 to further facilitate the cutting process. Coupling elements connected to ultrasonic generators can be directly connected to the blades 11 or the clamping devices 9 or elements 91, 92 of them, e.g. the tension rods, to introduce the ultrasonic energy.

FIG. 6a shows the mounting frame 110A of FIG. 4 coupled to an inventive conveying device 5, which has eight conveying channels 51A, 51B, each with a blade 11 assigned to it. By a separating device 52 separated product units 8, e.g. hazelnuts, are fed to each of the conveying channels 51A, 51B.

The mounting frame 110A can be coupled to the conveying device 5 by means of the drive device 4 and can carry out any cutting movements required during operation.

FIG. 6b shows the first conveying channel 51 in the area of the engagement of the associated blade 11. It is shown that the conveying channels 51A; 51B have receiving openings 50, which receive the product units 8, such as spherical nuts.

In this embodiment the conveyor channels 51A; 51B are two-part, so that the blades 11A, 11B, . . . are at least partially insertable into the conveyor channels 51A; 51B.

The conveyor channels are of sectional design and have conveyor elements 511, 512 or pairs of conveyor elements 511A, 511B; 512A, 512B, each preferably enclosing or limiting a receiving opening 50. The blade 11 can therefore be inserted between pairs of conveyor elements 511A, 511B; 512A, 512B to cut the product units 8.

The conveyor elements 511, 512; 511A, 511B; 512A, 512B) can be guided serially along guide elements and/or can be interlinked as a chain, e.g. in the manner of the elements of an escalator.

Preferably the conveying channels 51A; 51B with the receiving openings 50 and the blades 11A, 11B, . . . are arranged and displaceable relative to each other in such a way that the separated product units 8 receiving stored in the receiving openings 50 can be cut in two halves 88.

An optical inspection device is preferably used to inspect the processed product 88.

FIG. 7a shows in a preferred embodiment a blade holder with a mounting frame 110, which holds a wire-shaped blade 11, as well as a conveying channel 51A of a conveying device 5 with first and second conveyor elements 511A, 511B, each arranged on an endless member 583 and cyclically guided along a closed path. The conveyor elements 511A, 511B can be rotated laterally against each other to pick up a product unit 8 and release it again after processing. From a separating device separated product units 8 are delivered to a pair of conveyor elements 511A, 511B each. Processed product units 88 are fed to a first pick-up device 521. Separated shells 880 are delivered to a second pick-up device 522.

In this preferred embodiment there are always two pairs of conveyor elements 511A, 511B; 512A, 512B in the working area respectively working space 500 of the blade 11 and a separating tool 71, so that e.g. in a first step the shell 880 of the product unit 8 can be cut by means of the blade 11 and broken open by means of the separating tool 71 and in a second step the exposed core can be divided into two halves 88 by means of the blade 11. Furthermore, gear rods 1105 are shown which can engage in gear wheels 55 coupled to the conveyor elements 511A, 511B to rotate the conveyor elements 511A, 511B, or parts thereof. When the frame 110 is pulled down, the product unit 8 included in the conveyor elements 511A, 511B is therefore rotated around an axis perpendicular to the cutting plane, so that the product unit 8 can be cut peripherally, e.g. along a circular line. Using the separating tool 71, e.g. a wedge or a pair of scissors, shell parts cut open can then easily be separated from each other.

To operate the permanently mounted separating tool 71, a shaft-shaped functional rod 72 is provided, which has shaft bellies 721 and shaft nodes 722 (see FIG. 7b). After the separation of the shell parts 880, the core of the product unit 8 can be cut completely or partially.

FIG. 7b shows a pair of corresponding conveyor elements 511A, 511B of FIG. 7a, enclosing a product unit (not visible) and delimiting a working space 500 into which the wire-shaped blade 11 has been inserted. The two-part separating tool 71, held by a tool shaft 73 (dotted line), is actuated by the wave-shaped functional rod 72, which during a vertical movement rotates the parts of the separating tool 71, which are preferably tensioned by a spring, around the tool shaft 73.

FIG. 7c shows the conveying device 5 of FIG. 7a in another preferred configuration with first and second conveyor elements 541A, 541B, which can be rotated by means of motors 510A, 510B. A gear rod and gear wheels can be omitted in this embodiment. Furthermore, a first measuring device 1111, e.g. a laser measuring device, is schematically shown, which can be used to measure the position of each product unit 8 in the conveyor elements 541A, 541B. To compensate for incorrect positioning, a 561 displacement device driven by a motor 560 is provided, which can displace conveying device 5 to compensate for incorrect positioning. Alternatively, mispositioning can be compensated by shifting the blade 11. It is further shown that measurement signals from the first measuring device 1111 are transmitted to the control unit 1002 and processed there. Subsequently, the motor 560 or the drive device 4 are controlled to compensate for the misalignment.

FIG. 7d shows the rotatable conveyor elements 541A, 541B of FIG. 7c with a product unit 8, which is freed from a shell 880 by means of a wire-shaped blade 11 and a wedge 71.

FIG. 8a shows an inventive cutting device 1 with a preferably designed conveying device 5 and a control unit 1002. The conveying device 5 comprises a conveying channel 51A with first and second conveyor elements 511A, 511B; . . . ; 541A, 541B which are mounted on first and second carrier plates 585A, 585B. The carrier plates 585A, 585B are each connected to an endless member or a first and second endless chain 584A, 584B driven by a motor 581 via a drive shaft 582 and gears 583A, 583B. The conveyor elements 511A, 511B; . . . ; 541A, 541B are each equipped with a pivotally supported holder 518, which along the conveying path, by means of a guide plate 590, which has two parts 590A, 590B, are turned against each other and closed to hold the product unit on both sides. The enclosed product unit is subsequently processed with the blade 11 of the cutter 1.

FIG. 8b shows the cutting device 1 and the conveying device 5 of FIG. 8a with different functional units. A separating device or dispenser 52 is provided for dispensing the product units 8. A first receiving device 521 is provided to receive the divided product units 88. A second receiving device 522 is provided for receiving the separated shells 880. By means of a first measuring device 1111, the position of the product units 8 held by the conveyor elements 511A, 511B; . . . ; 541A, 541B can be measured. By means of a second measuring device 1112, the processed product units can be optically recorded, tested and stored by controlling the conveying device 5 accordingly. In addition, a suction device 1113 is provided, with which the product units 8 or parts thereof can be held in the conveyor elements 511A, 511B; . . . ; 541A, 541B or can be ejected at a delivery location, e.g. at the receiving devices 521, 522. For this purpose, the modules mentioned are preferably connected to the control unit 1002 via data lines and control lines.

FIG. 8c shows the conveying device 5 of FIG. 8b with a guide plate 590, which has two guide plate parts 590A, 590B opposing one another, which with opposing guide tracks 595A; 595B delimits a guide plate channel 591. The conveyor elements 511A, 511B comprise pivoted holders 518, which are provided with a guide element or a guide roller 517 at the top. When entering the guide plate channel 591 the guide rollers 517 are guided along the associated guide track 595A; 595B, whereby the holders 518 are rotated against each other and are closed vertically aligned in the middle of the guide plate 590 as shown. In the middle the guide plate 95 the holders 518 delimit the working space 500 of the blade 11, which can be inserted between the holders 518 to process the fixed product units 8. The carrier plates 585A, 585B are also equipped with guide rollers 5851A, 5851B, which are guided on the underside by the guide plate parts 590A, 590B in guide channels 592A, 592B. The product units 8 are therefore precisely conveyed and held and can also precisely be processed. The holders 518 are opened again at the outlet side of the guide plate 95, so that the processed product units 88 or parts 880 can be removed.

FIG. 8d shows the first conveyor element 511A and in sectional view the second conveyor element 511B of FIG. 8a, each with a holder 518 that is pivotally connected to a support plate 585A, 585B. Each holder 518 has an articulated shaft 5181 on both sides, which is held in flange openings 5853 of the support plate 585A or 585B in such a way that the holder 518 can be rotated. A joint shaft 5181 is enclosed by a spring, one end of which lies against the support plate 585A, 585B and the other end of which is held in a recess 5183 of the holder 518 and rotates it outwards against the support plate 585A, 585B. If the holders 518 are not in contact with the guide plate 590, they are turned apart and ready to accept a product unit 8. Each of the holders 518 is provided with a recess 5180 for this purpose, in which an insert 519 is preferably inserted. The insert 519 is preferably designed in the form of a thick-walled loudspeaker membrane. Alternatively, elastic segments can also be used in the recess. The elastic and compressible insert 519 allows compensating differences in the dimensions of the product units 8. Thus product units 8, whose dimensions vary within a relatively large tolerance range, can be captured by the conveyor elements 511A, 511B; . . . ; 541A, 541B preferably kept free of play. The insert 519 or alternatively used insert elements are preferably made of soft elastic rubber or a soft elastic elastomer.

It is further shown that the holder 518 and the optionally provided insert 519, each have an air duct 5188, 5190, which forms an intake duct, which is connected or connectable to the suction device 1113 (see FIG. 8b). Air can therefore be sucked in through the suction channel to hold the product unit 8 or its shell 880 in the recess 5180 or in the insert 519. The suction device 1113 is preferably controllable so that air can be sucked in or expelled to suck in or expel the product units 8.

FIG. 8e shows the first conveyor element 511A of FIG. 8d in exploded view. It can be seen that the support plate 585A has a recess 5850, into which the holder 518 can be turned.

The invention claimed is:

1. A device with a blade movable within an associated working space for cutting product units and with a conveying device in which the product units can be individually conveyed into the working space of the blade, wherein the conveying device comprises at least one two-part conveying channel associated with the blade, in which on one side first conveyor elements and on the other side second conveyor elements, which are assigned to one another in pairs, are guided, that the first and second conveyor elements each have a recess provided for partially receiving a separated product unit, and that the sides of the first and second conveyor elements which are facing one another, delimit therebetween the free working space, so that the blade is guidable within the working space in order to partially or completely cut a product unit held within the working space and held in the first and second conveyor elements which correspond to one another.

2. The device according to claim 1, wherein the first and second conveyor elements are connected to a common endless member, an endless belt or an endless chain, or that the first conveyor elements are connected to a first endless member, an endless belt or an endless chain, and that the second conveyor elements are connected to a second endless member, an endless belt or an endless chain.

3. The device according to claim 1, wherein in the recesses of the first conveyor elements and/or in the recesses of the second conveyor elements an elastic insert is arranged, which allows accommodating a separated product unit, whose dimensions are within a tolerance range.

4. The device according to claim 1, wherein the first conveyor elements and the second conveyor elements each have a holder, that is provided with the recess and that is connected turnable between an open position and a closed position to a support plate, which is connected to the endless member.

5. The device according to claim 4, wherein the holder and the support plate are interconnected by a spring by means of which the holder is rotated into the open position.

6. The device according to claim 4, wherein the holder is provided with a guide element and in that the conveyor device comprises a one-piece or two-piece guide plate having at least one guide track along which the guide elements can be guided in order to rotate the associated holder into the closed position.

7. The device according to claim 4, wherein the holder and/or the insert are provided with a suction channel which is connected or connectable to a controllable suction device.

8. The device according to claim 1, wherein the first conveyor elements and the second conveyor elements are rotatably mounted or that the first conveyor elements and the second conveyor elements are rotatably mounted about an axis extending at least approximately perpendicular to a cut surface along which the blade is displaceable.

9. The device according to claim 1, wherein the blade is attached to a blade holder which is connected to a drive device held by a framework and which by means of the drive device can be rotated within the working space and/or guided along a working path which extends linearly or along a curve.

10. The device according to claim 9, wherein the drive device comprises a plurality of actuators which are individually controllable and which are each connected on one side to the blade holder via a first swivel joint and on the other side to the framework via a second swivel joint in such a way that the blade holder is held solely by the actuators.

11. The device according to claim 9, wherein the blade holder holds at least two blades which are each associated with a conveying channel and a working space associated therewith and are movable within the associated working space.

12. The device according to claim 10, wherein the blades are held under tension in an associated frame by means of tensioning devices.

13. The device according to claim 1, wherein at least one of the blades can be connected or connectable to an ultrasonic source via a coupling element and an energy converter.

14. The device according to claim 1, wherein a separating device is provided, which comprises at least one separating tool and an actuating device for actuating the separating tool, which can be introduced into the working space and can be actuated in order to separate the shell of a product unit, which has been cut open by means of the at least one blade.

15. The device according to claim 12, wherein the separating device is held by one of the frames.

\* \* \* \* \*